(12) United States Patent
Borghi et al.

(10) Patent No.: US 12,097,544 B2
(45) Date of Patent: Sep. 24, 2024

(54) DEVICE, MACHINE AND METHOD FOR WASHING OBJECTS FOR STALLING LABORATORY ANIMALS, IN PARTICULAR, PARTS AND/OR ACCESSORIES OF STALLING CAGES

(71) Applicant: IWT SRL, Casale Litta (IT)

(72) Inventors: Matteo Borghi, Legnano (IT); Michele Vitali, Angera (IT)

(73) Assignee: IWT SRL, Casale Litta (IT)

( * ) Notice: Subject to any disclaimer, the term of this patent is extended or adjusted under 35 U.S.C. 154(b) by 0 days.

(21) Appl. No.: 18/164,089

(22) Filed: Feb. 3, 2023

(65) Prior Publication Data

US 2023/0256484 A1 Aug. 17, 2023

(30) Foreign Application Priority Data

Feb. 11, 2022 (IT) .................. 102022000002522

(51) Int. Cl.
*B08B 9/093* (2006.01)
*A01K 1/035* (2006.01)
(Continued)

(52) U.S. Cl.
CPC ............ *B08B 9/0936* (2013.01); *A01K 1/035* (2013.01); *B08B 9/0861* (2013.01); *B08B 13/00* (2013.01); *B08B 2209/08* (2013.01)

(58) Field of Classification Search
CPC ..... B08B 9/0936; B08B 9/0861; B08B 13/00; B08B 2209/08; A01K 1/035
See application file for complete search history.

(56) References Cited

U.S. PATENT DOCUMENTS 4,408,625 A * 10/1983 Kuhl .................... B08B 3/02
134/123
6,565,668 B1 * 5/2003 Sandberg ................ A01K 1/01
239/722
(Continued)

FOREIGN PATENT DOCUMENTS

| CA | 2420432 A1 | 8/2003 | |
|---|---|---|---|
| EP | 2366465 A1 * | 9/2011 | ............... B08B 3/02 |
| EP | 3248697 A1 * | 11/2017 | ............. A01K 1/031 |

OTHER PUBLICATIONS

Italian Search Report dated Sep. 5, 2022 from counterpart Italian Patent Application No. 102022000002522.
(Continued)

*Primary Examiner* — Sharidan Carrillo
(74) *Attorney, Agent, or Firm* — SHUTTLEWORTH & INGERSOLL, P.L.C.; Timothy J. Klima

(57) ABSTRACT

A washing device for washing objects for stalling animals includes: a rod extending along a main axis and connectable to a source of pressurized washing fluid; a fluid conveying device connected to the source and associated with the rod; nozzles for emitting jets of the fluid, the nozzles being connected to the device and supported by the rod; a translation mechanism for translating the rod along a stroke extending along a translation axis transversal to the main axis, and a rotation mechanism for alternately rotating the rod about a rotation axis parallel to the main axis. The translation and rotation mechanisms are selectively operable for moving the rod inside an operating plane defined by the main axis and by the translation axis to direct the jets against the surfaces to be washed.

11 Claims, 7 Drawing Sheets

(51) Int. Cl.
*B08B 9/08* (2006.01)
*B08B 13/00* (2006.01)

(56) References Cited

U.S. PATENT DOCUMENTS

2011/0226285 A1   9/2011   Savoia et al.
2023/0256484 A1*  8/2023   Borghi .................. B08B 9/0861
                                                134/18

OTHER PUBLICATIONS

European Search Report dated Jun. 14, 2023 from counterpart European App No. 23150093.5.

* cited by examiner

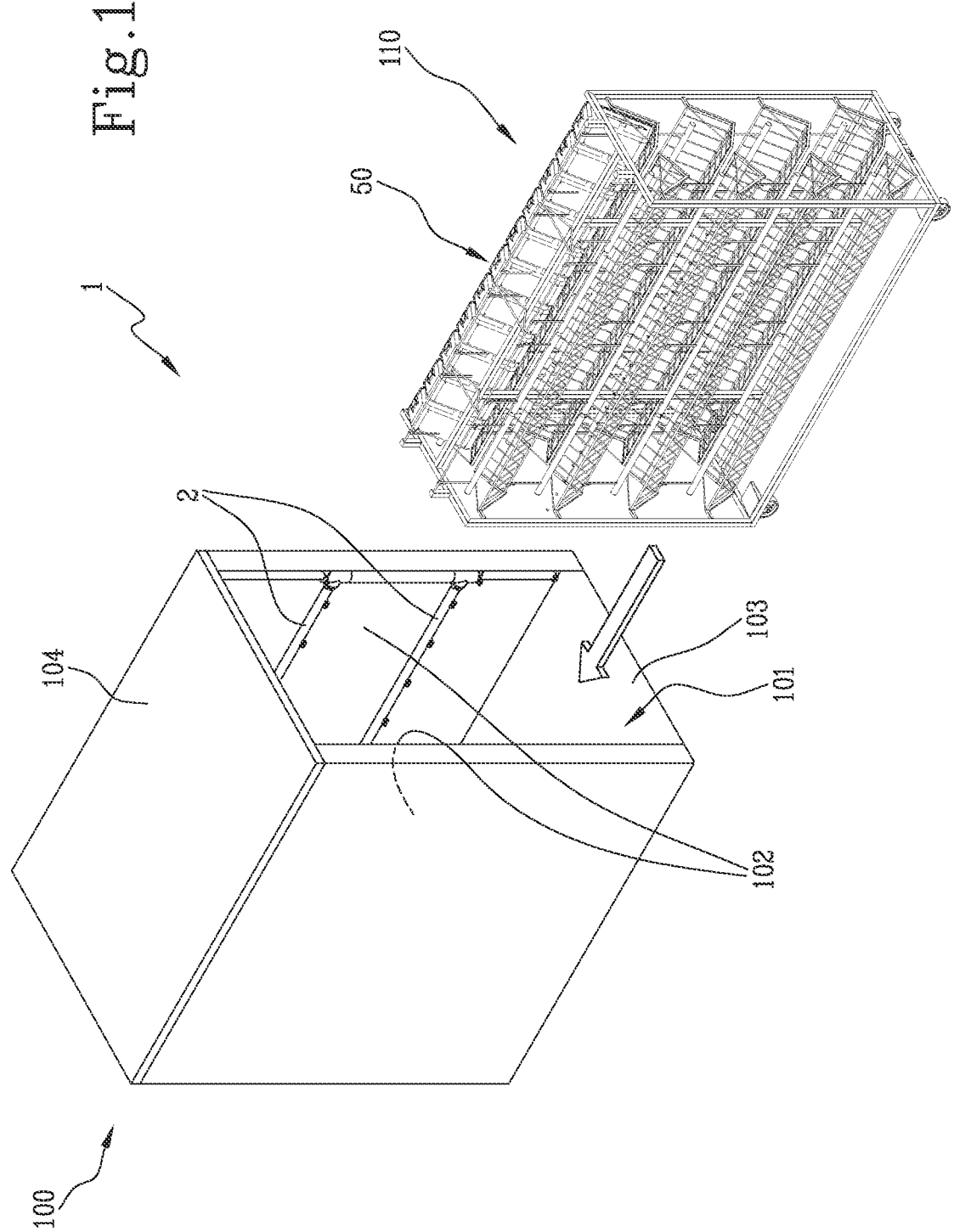

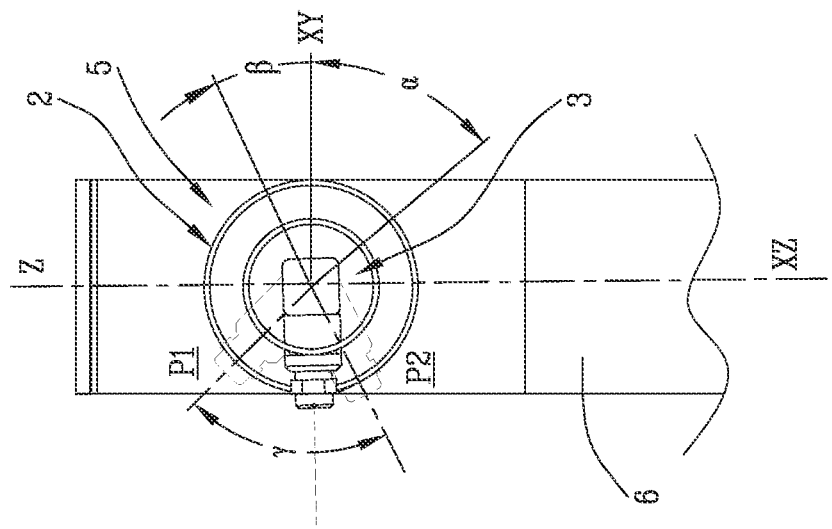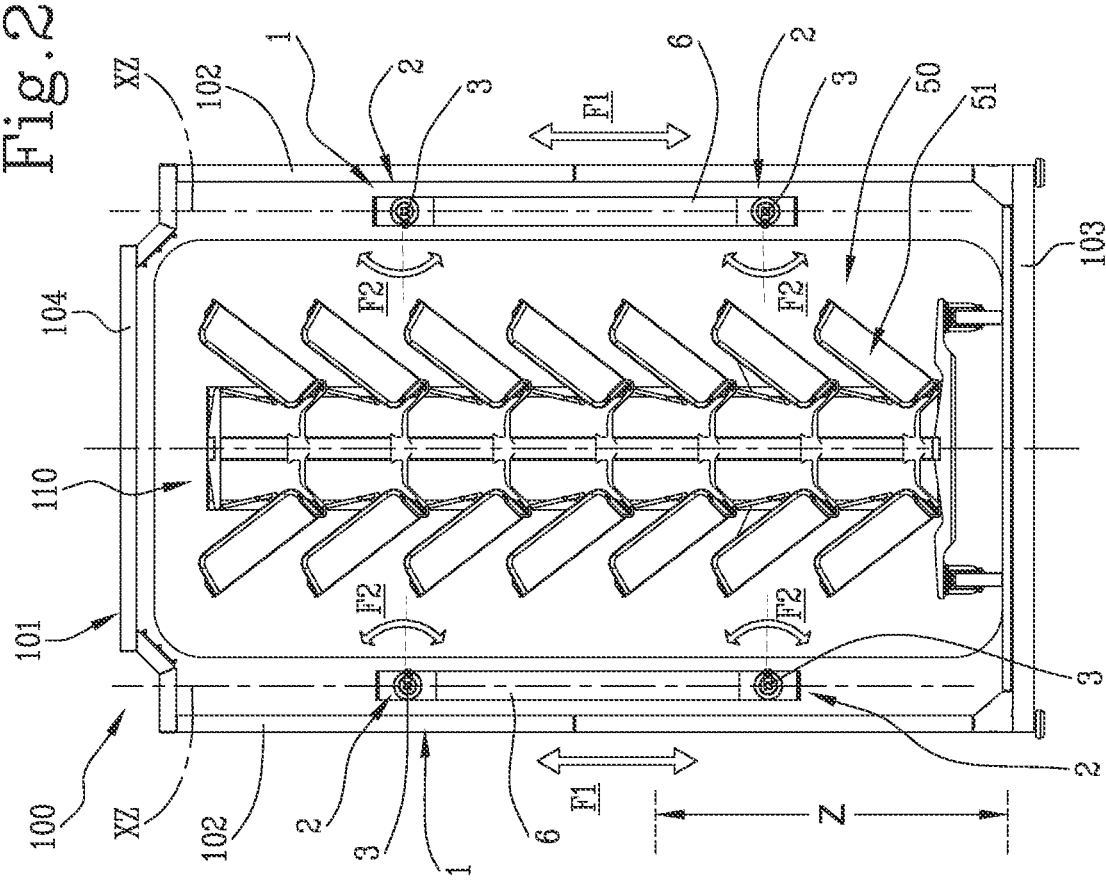

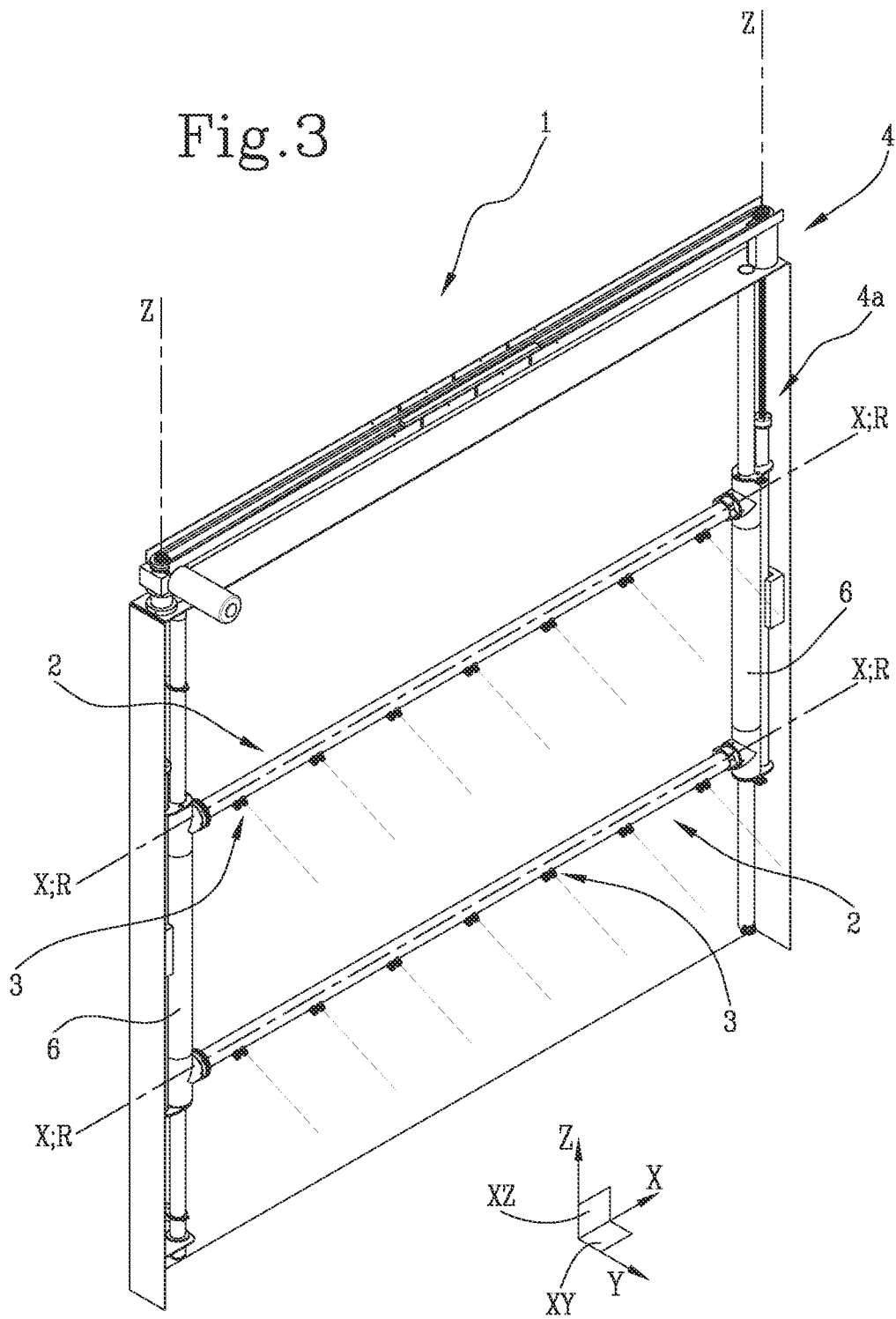

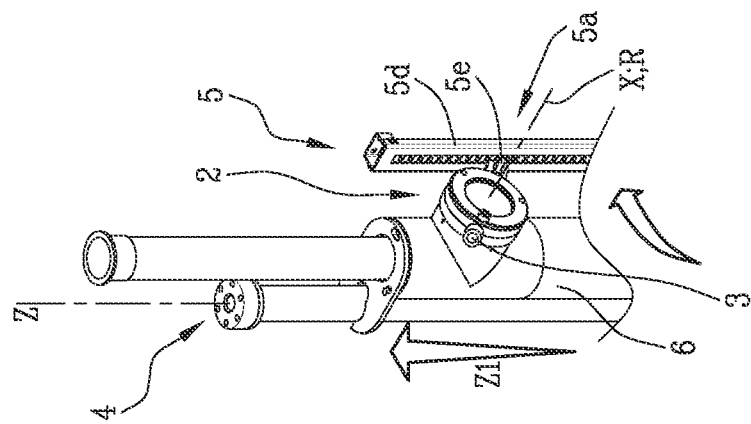
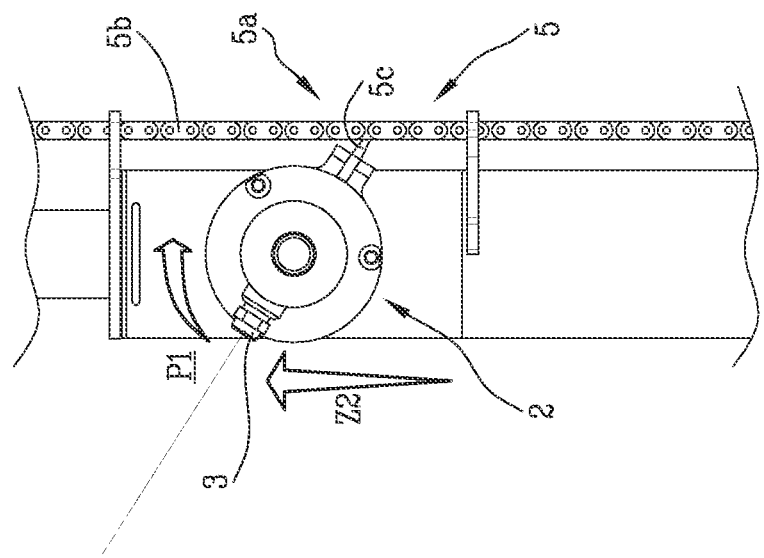
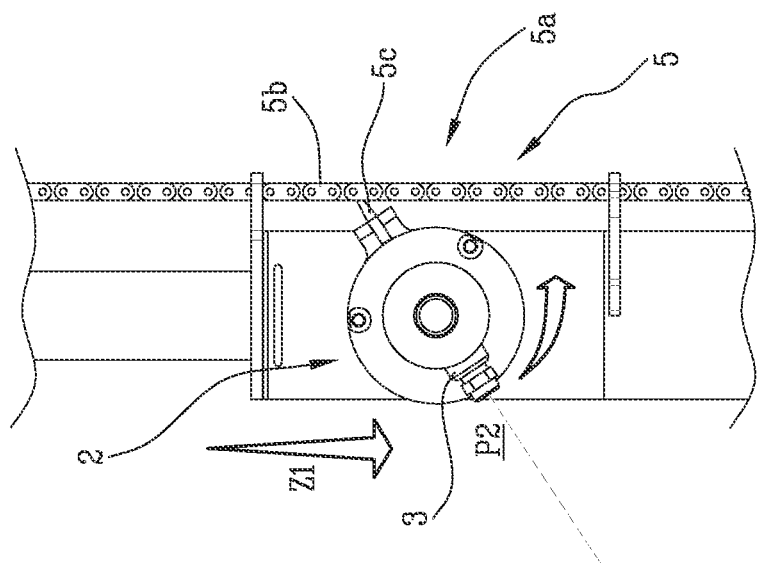

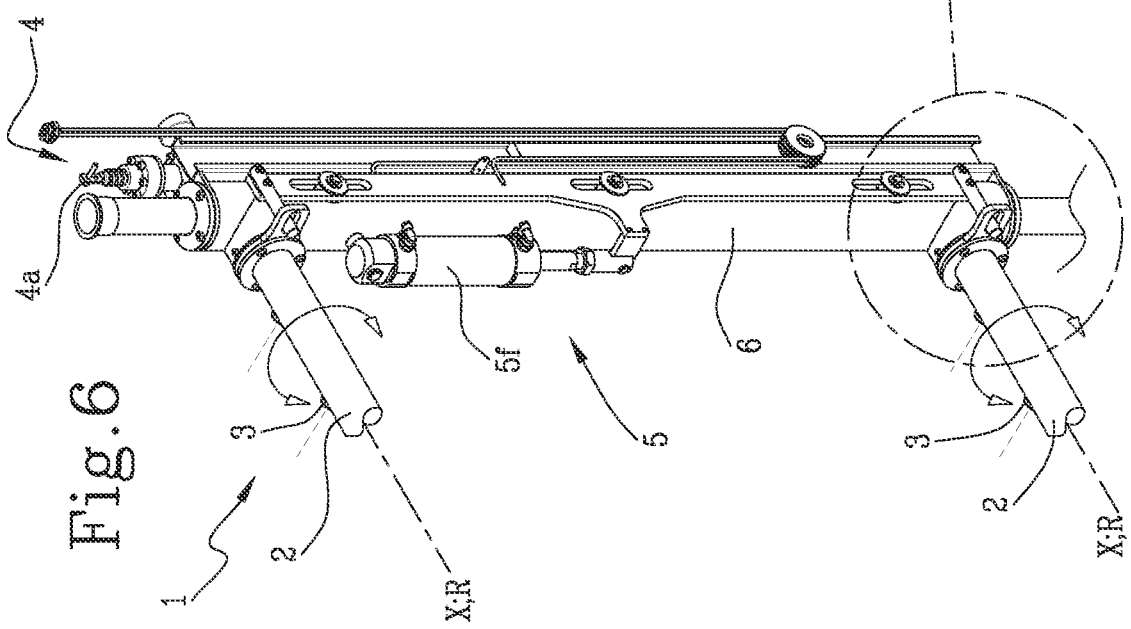
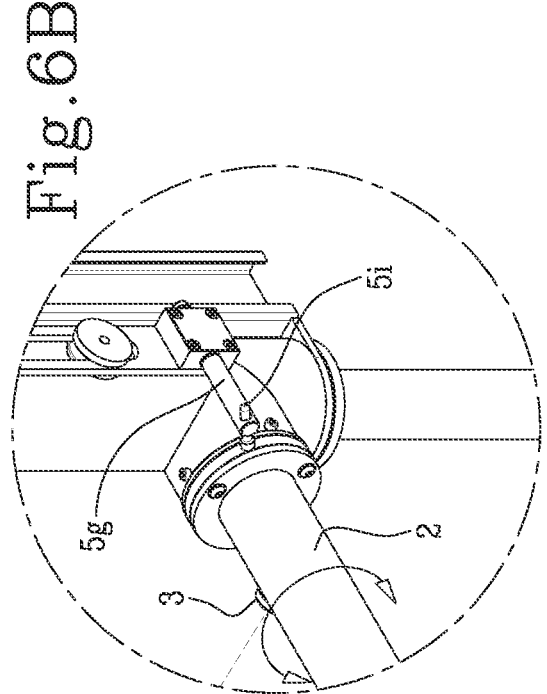
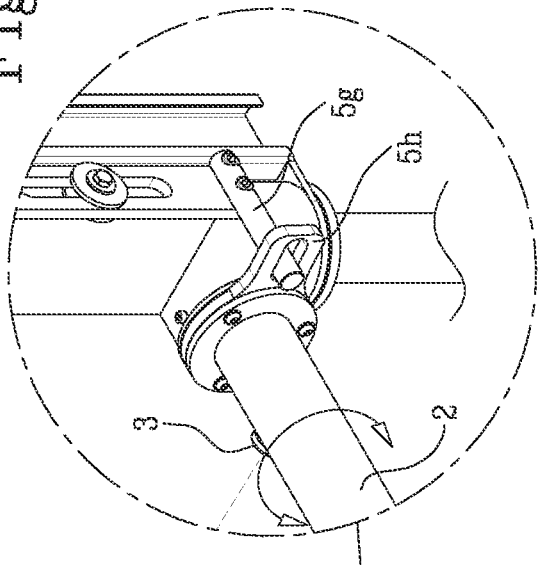

DEVICE, MACHINE AND METHOD FOR WASHING OBJECTS FOR STALLING LABORATORY ANIMALS, IN PARTICULAR, PARTS AND/OR ACCESSORIES OF STALLING CAGES

This application claims priority to Italian Patent Application 102022000002522 filed Feb. 11, 2022, the entirety of which is incorporated by reference herein.

FIELD OF APPLICATION

The object of the present invention is a device, machine and method for washing and/or rinsing objects for stalling laboratory animals, in particular, parts and/or accessories of stalling cages, for example, bases, covers, feeders and drinking bottles.

The present invention indeed is particularly applicable to the field of pre-clinical pharmaceutical research.

Therefore, from this point on, reference will be made to washing of cages for stalling animals, without for this the invention having to lose its generality.

BACKGROUND ART

It is known in the field of pre-clinical pharmaceutical research, in particular, in the field of animal stalls and relative washing areas where the laboratory animals are held, to employ washing and/or rinsing systems adapted to clean—and therefore reuse—the animal stalling cages. The latter may be obtained according to different technologies, materials and measures, compatibly with the application for which they are intended.

In particular, batch type washing and rinsing systems are known, based on machines having different sizes, where the cages and the components thereof are introduced into the washing systems after being loaded onto a loading trolley and/or specific loading shelves in the machines themselves. Such machines are commonly called in the field "rack washers" or "cage washers".

The loading trolleys and loading shelves usually are made so as to expose the cages and the accessory parts thereof to the washing systems in the machines.

The washing systems may be of different types, for example: having fixed rods, oscillating rods, translating rods or rotating rods.

The rack washers have a wash chamber, conventionally parallelepiped in shape, where at least either the front wall or the rear one is used as loading/unloading area, while the washing system is installed on at least one of the two opposite side walls (conventionally on both).

Certain rack washers also have a washing system located on the upper surface of the wash chamber, that is, close to the area defined as roof or ceiling of the wash chamber.

The trolley, which is inserted into the machine, is then arranged between the side walls to expose the two loaded sides (on which the cages were loaded, for example) to the washing systems.

Indeed, the cages usually are arranged on both sides of the trolley to take advantage of both washing "benches" of the machine so as to optimize the washing operations.

Conventionally, a stalling cage comprises a base, cover and feeder, which are mutually separable from one another.

The trolleys of the known type provide shelves for containing the parts of the cages which allow them to be rested and contained so as to correctly expose the surfaces to be washed (in particular, the inner/concealed and dirtiest parts) to the direct washing jets and so that most of the surfaces of the parts of the inclined cages themselves drain so as to minimize stagnating fluid at the end of the cycle and facilitate the drying thereof.

It should be noted that the expression "surface to be washed" here means a surface of the object which is to be directly struck by the jets of pressurized fluid to be correctly processed, that is washed and/or rinsed.

It is thus apparent that the effectiveness of the washing and/or rinsing system is measured by the ability of the system itself to reach, with the washing/rinsing solution jets, most of the surfaces of the objects to be washed/rinsed in direct manner so as to act on said surfaces with the mechanical action (force of impact) of the jets themselves.

It is indeed known that the residual dirt in stalling cages after the stalling, especially on the inner surfaces of the bases, is partly removable by chemicals (with the use of specific detergents and adequate washing and/or rinsing temperatures), but that there is also a need for a strong mechanical action to remove most of the residual dirt and give the chemicals the chance to act on the residual layer alone by decreasing the presence of organic material on the load.

Indeed, it may be possible to provide specific pre-wash steps in these machines, where the action on the load to remove most of the dirt and bring it towards the machine drain is just of mechanical nature (low temperatures, without detergent); such a step may be required if there is an increased presence of dirt because the direct employment of temperature and deterging could become ineffective or very costly (in terms of use of increased concentrations of detergent with subsequent impact on the cycle cost and on the residuals at the drain) and also result in operating problems (high temperatures and/or concentrations of detergent may result in stress for the machine and the load and also create foam phenomena which decrease the performance and/or blocks the machine itself).

The Applicant has discovered how washing of stalling objects has significant criticalities mainly associated with the efficiency and effectiveness of the washing fluid jets.

The correct directing of the washing fluid is indeed necessary to obtain effective washing of the surfaces to be washed of the objects in the wash chamber.

The coverage ability of the washing system, intended as the ratio between the total surface to be washed of the objects and the actual surface of the objects washable by the machine (that is, the surface actually directly reachable by the jets of fluid coming out of the nozzles) is to be as close to 1 as possible.

The washing devices installed in wash chambers conventionally comprise hollow rods connected to a source of pressurized fluid and provided with nozzles from which the washing fluid is emitted.

A first solution, in disuse now, provides the employment of "rotating type rods" (similar to those of dishwashers) for washing the concave objects; it is apparent how the coverage ability for this type of loads is extremely limited and difficult.

A second solution, also in disuse now unless for timely washing/rinsing of specific loads, is the one of "fixed type rods", diagrammatically shown in accompanying FIG. 0A: however, the need to effectively reach the concavities of the individual objects "OBJ" requires a remarkably high number of nozzles "NOZ", thus generating the need for much washing/rinsing fluid in circulation (and relative installed powers and required storages) or a significant decrease in the force of impact thereof (low outflow speed on the individual nozzles and atomized jet).

A solution still implemented instead is the one of the "translating type rods": washing/rinsing rods extending horizontally and translating along the vertical axis are installed on the two benches of the machine. One or more rods may be used according to the vertical stroke available, thus balancing stroke/coverage/nozzle number. Usually, such solutions employ jets directed perpendicularly at the benches, which strike the inside of the cage.

However, it is apparent how such a solution has a significant functional limit, which is the one of not being capable of adequately covering the upper inner corners of the exposed cages which therefore remain uncovered by a direct impact (as shown in accompanying FIG. 0A). Indeed, the bases of the cages conventionally are arranged inclined to facilitate the draining of the washing fluid, however this positioning makes it difficult for certain inner corners to be reached by the jets of fluid since they are covered by the side walls of the bases. These areas of the objects which can not be directly struck by the jets are defined as "dead areas" (diagrammatically illustrated with a thick line in FIGS. 0A and 0B).

In order to optimize the number of cages to be washed with a single wash cycle, not only are cages often arranged on the loading trolley so that they are inclined, but they are also at least partially overlapping to optimize the spaces inside the wash chamber. Thus, the side wall of an object may cover one or more surfaces to be washed (in particular, but not limited to, inner concave surfaces otherwise definable with the generalizing expression "concavities") of another adjacent object (that is, it is positioned between the nozzle and the surface to be washed of the adjacent object), in fact increasing the dead areas and decreasing the coverage ability of the washing device/machine.

Moreover, the translating-type rod solution often does not allow the roof and the bottom surface of the machine to be adequately washed, which therefore remain covered in residuals and/or spatters due to the washing.

The current standard in the field, which is recognized as the most effective and flexible system, is the one of "oscillating rods" (diagrammatically illustrated in accompanying FIG. 0B), which provides a varying number of horizontal rods fastened to the benches which are rotatable about the axis thereof with a suitable sized oscillation angle according to the number of rods installed per bench.

In addition to ensuring good load coverage, such a washing system allows the roof and the bottom of the wash chamber also to be adequately covered. By optimizing the number of rods and the oscillation, it was possible to decrease the number of jets employed, thus favoring the outflow per jet, thus allowing the force of impact of the jet to be gradually increased. However, it was ascertained that for optimal use, there was the need to provide at least 3 oscillating rods per bench, considering a standard size of rack washers being mostly employed.

The Applicant has also observed how the distance between the jets and the objects to be washed should be as uniform as possible to avoid having similar surfaces of the treated object struck in a non-uniform manner, an aspect which may result in a non-uniform washing result on the total load (the force of impact of a jet exponentially decreases with the distance between origin of the jet and surface to be washed). It is apparent how the oscillating rod solution is not capable of ensuring this important criterion since the distance between a nozzle "NOZ" and an object "OBJ" remains fixed, that is different areas of an object "OBJ" will have a different distance from a nozzle "NOZ" and therefore will be struck by the jet at a different distance.

Also, this solution has the overlapping limit discussed above for the translating-type of rods: the objects to be washed indeed are to be exposed without overlapping, that is the number of rows is to be such as not to create overlapping between the upper part of the cage of the lower row and the lower part of the cage of the upper row, otherwise several dead areas are again defined.

This inevitably decreases the number of rows of objects which may be arranged at each wash cycle.

In this context, the technical task at the basis of the present invention is to propose a device, a machine and a method for washing objects for stalling laboratory animals, in particular, parts and/or accessories of stalling cages, which overcome one or more of the above-mentioned drawbacks of the known art.

In particular, it is the object of the present invention to provide a washing device, machine and method capable of moving a plurality of washing nozzles so as to thoroughly wash the surfaces to be washed of the objects, in particular, the concavities present on the surfaces of the concave objects, also in the presence of partially overlapping rows (with respect to a side view of the rack on which the rows are arranged).

Again, it is the object of the present invention to propose a washing device, machine and method which allow the number of nozzles required for washing to be optimized— that is decreased—so as to optimize—that is increase—the mechanical action of the individual jets.

It is a further object of the present invention to provide a washing device, machine and method which allow the impact distance between the nozzles and the surfaces to be washed of the objects to be kept as uniform as possible during the wash cycle.

Finally, it is the object of the present invention to provide a washing method which is efficient, effective and versatile, thus allowing to adapt to various numbers and types of cage parts and/or accessories to be washed and at various soiled conditions.

SUMMARY OF THE INVENTION

The technical task explained and the specified objects substantially are achieved by a device, machine and method for washing and/or rinsing (hereinafter simply "washing" for descriptive simplicity) objects for stalling laboratory animals, in particular, parts and/or accessories of stalling cages, comprising the technical features disclosed in one or more of the appended claims.

In particular, a first aspect of the present invention provides a washing device of objects for stalling laboratory animals, in particular, parts and/or accessories of stalling cages, comprising at least one rod extending along a main axis and connectable to a source of pressurized washing fluid.

The device further comprises fluid conveying means connected to the source of pressurized washing fluid and associated with the rod.

Device 1 then comprises a plurality of nozzles adapted to emit respective jets of the washing fluid.

The plurality of nozzles is connected to the aforesaid fluid conveying means and is supported by the rod.

In other words, the nozzles are in fluid communication with the source of washing fluid.

It should be noted to this end, that the expression "nozzle" here also means any orifice, hole or recess obtained in one piece on the rod, from which the washing fluid exits.

Advantageously, the device further comprises:
translation means of the at least one rod, which are configured to translate it along a translation stroke extending along a translation axis, which is transversal, preferably perpendicular, to the main axis, and
rotation means of the at least one rod, which are configured to alternately rotate it about a rotation axis parallel to, and preferably coincident with, the main axis inside a rotation angle.

In other words, the rod is roto-translatable or translating-oscillatable to emit jets of fluid in several directions.

In particular, according to the invention, the translation means and the rotation means are selectively operable according to a predetermined logic for moving the rod inside an operating plane defined by the main axis and by the translation axis.

Thereby, when the washing device is employed to wash a plurality of objects operatively arranged facing the operating plane with the respective surfaces to be washed facing the rod, by means of jets of washing fluid emitted by the nozzles, that is during a use configuration of the device, the jets of washing fluid may be directly emitted against the surfaces to be washed to wash them thoroughly.

The possibility of rotating and/or translating the rod therefore allows the device to arrange the nozzles in several operating positions to effectively and efficiently strike any surface to be washed, in particular any surface concavity (also the most hidden and overlapping ones) of the objects.

A second aspect of the invention provides a machine for washing objects for stalling laboratory animals, in particular, parts and/or accessories of stalling cages, comprising at least one washing device according to the present invention inserted or insertable inside a sealed wash chamber.

The machine indeed comprises a sealed wash chamber having at least one access door and at least one washing wall on which at least one washing device is installed.

The machine further comprises at least one support device configured to receive and support a plurality of objects so as to arrange the respective surfaces to be washed of the objects, during the use configuration, facing the operating plane.

Advantageously therefore, the machine allows a plurality of objects to be thoroughly washed in an effective and efficient manner in a reduced space with respect to the known art: the presence of at least one washing device according to the present invention indeed allows also washing overlapping rows of objects because the at least one rod is selectively controllable according to a predetermined logic whereby the nozzles are able to direct jets towards any surface to be washed, in particular, towards any concavity.

The same wash chamber may therefore be employed to effectively wash various types of objects arranged on the support device according to several configurations and in varying amounts, it being easily adaptable to the load.

A third aspect of the invention provides a method for washing objects for stalling laboratory animals, in particular, parts and/or accessories of stalling cages, comprising the steps of:
providing at least one washing device (preferably of the type of the present invention) comprising
a rod extending along a main axis and connectable to a source of pressurized washing fluid,
fluid conveying means connected to the source of pressurized washing fluid and associated with the rod,
a plurality of nozzles adapted to emit respective jets of washing fluid, in which the plurality of nozzles is connected to the fluid conveying means and supported by the rod,
translation means of the at least one rod, which are configured to translate the at least one rod along a translation stroke extending along a translation axis, which is transversal, preferably perpendicular, to the main axis, and
rotation means of the at least one rod, which are configured to alternately rotate the at least one rod about a rotation axis parallel to, and preferably coincident with, the main axis inside a rotation angle;
providing a plurality of objects on at least one support device so that respective surfaces to be washed of the objects are operatively facing an operating plane defined by the main axis and by the translation axis;
selectively controlling the actuation of the translation and rotation of the at least one rod according to a predetermined logic for moving the at least one rod inside the operating plane so that it faces the respective surfaces to be washed of the objects, and
emitting a predetermined amount of jets of washing fluid from the plurality of nozzles directly against the respective surfaces to be washed of the objects in order to wash them thoroughly.

Therefore, by virtue of the present method, a thorough washing of every surface portion of the objects to be washed (in particular, of the concavities or "concave areas") arranged on the support device may be obtained by simply moving the rod according to a predetermined logic providing the translation along the translation stroke and/or the rotation about the rotation axis.

Thus, the invention allows important advantages to be achieved, among which:
an increase in the productivity and flexibility of the washing process by defining a "smart wash" capable of adapting the washing logic to the actual load introduced, in terms of geometry, numbers and/or degree of dirt: indeed, by virtue of the possibility of moving and rotating the nozzles over the operating plane, each point of the surfaces to be washed (in particular, the concave surfaces) of the objects may be cyclically struck in direct manner;
an optimization of the number of nozzles required to thoroughly wash the load: by virtue of the roto-translation of the rod, the number of nozzles required is decreased and accordingly, the flow rate of the jet of each nozzle is maximized.
a reduction in consumption: fewer jets of washing fluid directed outside the target and less amount of fluid required against a more efficient mechanical dirt removal action;
optimal coverage also at overlapping areas of the load due to an increased number of rows of objects: by virtue of the roto-translation, the cycle productivity may be increased, various scenarios of use may be dealt with and the load density may be increased.

The dependent claims, incorporated herein for reference, correspond to different embodiments of the invention.

Further features and advantages of the present invention will be more apparent in the following indicative and consequently non-limiting description of a preferred but non-exclusive embodiment of a device and washing machine, as shown in the accompanying drawings.

BRIEF DESCRIPTION OF THE DRAWINGS

FIG. 1 is a diagrammatic perspective view of a washing machine according to the present invention.

FIG. 2 is a diagrammatic section of the washing machine in FIG. 1, during a use configuration of the washing device.

FIG. 2A is a detailed enlargement diagrammatically showing the rotation of the rod.

FIG. 3 is a diagrammatic perspective view of a washing device according to the present invention.

FIGS. 4A and 4B diagrammatically show the operation of a first embodiment of the rotation means of the washing device of the present invention.

FIG. 5 diagrammatically shows the operation of a second embodiment of the rotation means of the washing device of the present invention.

FIG. 6 diagrammatically shows the operation of a third embodiment of the rotation means of the washing device of the present invention.

FIG. 6A is an enlargement of a detail in FIG. 6, while FIG. 6B is a construction variant of the third embodiment of FIG. 6.

DETAILED DESCRIPTION

Figure 0B:
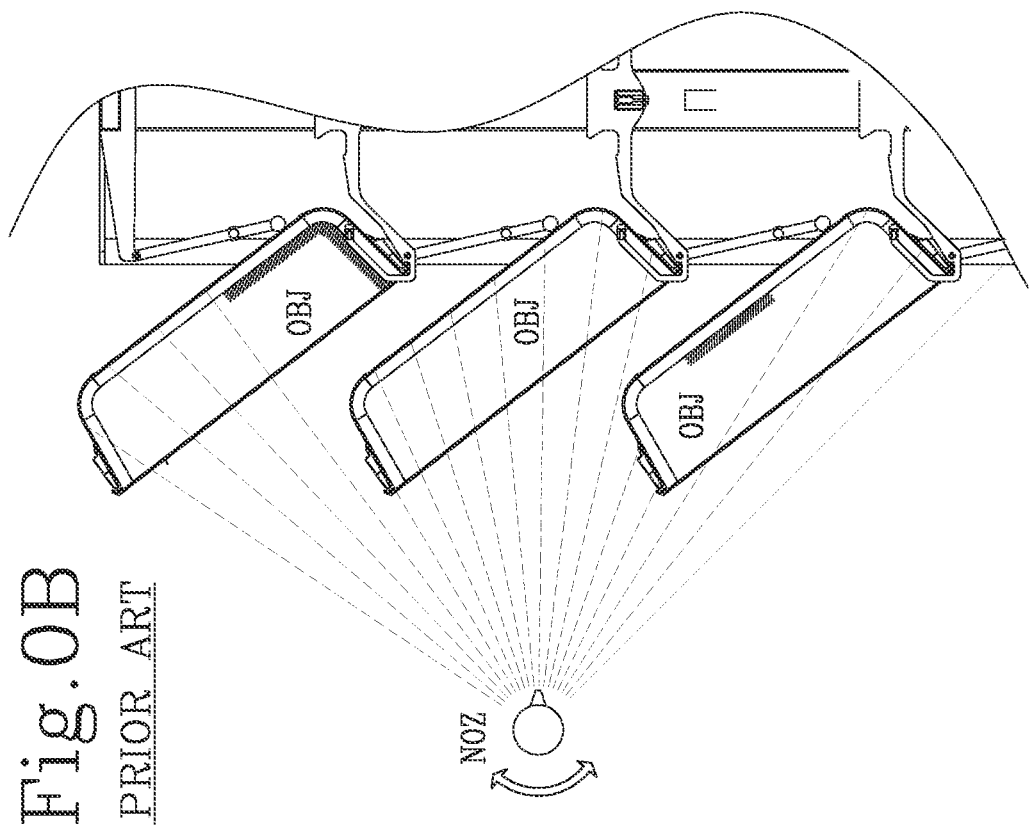
FIGS. 0A and 0B are operating diagrams of respective washing devices according to two separate solutions of the known art.

With reference to the accompanying drawings, a washing device is indicated as a whole by 1, while the washing machine 100 is indicated as a whole by 100.

It should be noted that for the purposes of the present invention, the term "washing" may be understood also as a "rinsing" process according to the intensity of the jet, to the composition of the washing fluid and to the washing logic.

In particular, device 1 of the present invention is configured to wash (and/or rinse) objects 50 for stalling laboratory animals, in particular, parts and/or accessories of stalling cages (hereinafter simply objects 50 for descriptive simplicity) having respective surfaces 51 to be washed. The surfaces 51 to be washed here define the surfaces of the objects 50 requiring a particular (washing and/or rinsing) process/treatment to remove the dirt and impurities which accumulated during normal use. Reference in particular is mainly made to the surfaces which, during use of the objects 50, are exposed to direct contact with the laboratory animals and their waste.

In particular, the following description refers to concave surfaces 51 to be washed, or more simply, concavities 51, to better clarify and highlight the advantages of the invention with respect to the known art, without for this the invention having to lose in generality.

In particular, the device is configured to thoroughly wash at least the concave surface of such objects 50, that is, that surface portion of the concave object 50, which for simplicity, is indicated as "concavity" 51.

Device 1 comprises at least one rod 2 extending along a main axis X and connectable to a source of pressurized washing fluid (not shown in the accompanying drawings).

Device 1 further comprises fluid conveying means connected to said source of pressurized washing fluid and associated with rod 2: such fluid conveying means may be made with any technology or structure of the known type.

Device 1 then comprises a plurality of nozzles 3 adapted to emit respective jets of said washing fluid, in which the plurality of nozzles 3 is connected to the aforesaid fluid conveying means and therefore, is supported by rod 2.

In a possible embodiment of the invention, rod 2 is hollow, and this means that the fluid conveying means comprise at least one conduit extending inside the hollow rod 2 itself, and therefore the plurality of nozzles 3 is in fluid communication with such a conduit.

The term "hollow" indicates the presence of a conduit inside rod 2 (shown in FIG. 2A), which is connectable or connected in fluid communication with the source of pressurized washing fluid.

Within the spirit of the present invention, the term "axis" may be considered as any ideal progress in space in terms of geometrical development of a structural element and/or in terms of possible roto-translational movement (or in other words, of any trajectory) of such a structural element, without departing from the objects of the invention itself and without limitations to the interpretation of the claims appended herein.

Each rod 2 has a plurality of nozzles 3 adapted to emit respective jets of the washing fluid.

Preferably, the jets emitted by the nozzles have a conical shape (that is, the spray is of the conical type) or conical cross section, however the shape of the jet may be selected according to the type of concave object and the type of wash to be performed.

Preferably, in the embodiment shown in the accompanying drawings, rod 2 has two separate and concentric inner ducts belonging to different manifolds connected to different washing fluids and there may be nozzles 3 on the same rod 2 which alternately dispense a first fluid and a second fluid.

Device 1 advantageously comprises both translation means 4 of rod 2 and rotation means 5 of rod 2.

The translation means 4 are configured to translate rod 2 along a translation stroke z extending along a translation axis Z, which is transversal, preferably perpendicular, to the main axis X.

In other words, rod 2 is translatable along a rectilinear trajectory defined by the translation stroke z (shown in FIG. 2).

Preferably, the translation means 4 comprise a screw and nut mechanism 4a (shown in FIG. 3), however other known mechanisms which perform the same function may be used.

The screw is put into rotation by suitable actuation: the type of actuation may be of any kind (electric by means of gear motor, pneumatic, hydraulic) and is not part of this invention given that it is a known system.

The rotation means 5 are configured to alternately rotate the at least one rod 2 about a rotation axis R parallel to the main axis X inside a rotation angle γ, as indicated in FIG. 2A.

With particular reference to the embodiments shown in the accompanying drawings, the rotation axis R preferably is coincident with the main axis X; however, according to a possible embodiment not shown in the accompanying drawings, the rotation axis R could be arranged eccentrically with respect to the main axis X.

Preferably, the rotation angle γ has a value between 0° and 150°, even more preferably, it is equal to 75°.

In other words, as diagrammatically shown in FIG. 2, each rod 2 may translate in the direction indicated by arrow F1 and rotate in the direction indicated by arrow F2.

Therefore, the translation means 4 and the rotation means 5 advantageously are selectively operable according to a predetermined logic (that is, predetermined by the user or predetermined following given detections, as is more apparent in the description below) to move the at least one rod 2 inside an operating plane XZ defined by the main axis X and the translation axis Z.

Thereby, during a use configuration of device 1 in which the jets of washing fluid are emitted from the nozzles 3 and the objects 50 are operatively facing the operating plane XZ with the respective concavities 51 facing the at least one rod 2, the jets of washing fluid can be directly emitted against the concavities 51 to wash them thoroughly.

In other words, one or more translations and/or rotations of rod 2 may be controlled so that rod 2 is arranged in one or more predetermined positions inside the operating plane XZ so that the emitted jets can strike, that is they are directed, and thoroughly wash each concavity 51 of the objects 50 in a cyclical manner and according to determined washing criteria (wash time, cycle number, jet flow rate, etc.).

With particular reference to the embodiment of device 1 illustrated in the accompanying drawings, device 1 preferably comprises two parallel rods 2 lying inside the same operating plane XZ, even more preferably, mutually constrained in the translation along the translation stroke z. In other words, the two rods 2 move with a synchronous translation, while they may rotate independently or dependently according to the washing needs.

Two rods indeed are a balanced solution for meeting both the cost parameters and dimensions of device 1.

With particular reference to the embodiment of device 1 illustrated in the accompanying drawings, further preferably the operating plane XZ is vertical, the translation axis Z is vertical, and the main axis X is horizontal.

In other words, the translation of rod 2 is vertical and is carried out from the top downwards and vice versa; however, for example, also the horizontal translation whereby the translation could be carried out from left to right and vice versa, falls within the inventive concept of the invention.

Preferably, the rotation means 5 comprise an inclination switch 5a configured to reversibly switch the inclination of the at least one rod 2 between a first angular switching position P1 and a second angular switching position P2.

In particular, as shown in the example in FIG. 2A, the first angular switching position P1 corresponds to a first angle of inclination α of rod 2 (and therefore of the direction of the jet of washing fluid) with respect to a neutral (or middle) plane XY perpendicular to the operating plane XZ, while the second angular switching position P2 corresponds to a second angle of inclination β of the rod with respect to the neutral plane XY, said angular switching positions preferably being opposite to said neutral plane XY.

In particular, the neutral plane XY preferably is horizontal.

In particular, the switching between the two angular switching positions P1, P2 may be carried out progressively or instantaneously, and may be dependent or independent on a translation motion along stroke Z, as apparent below.

Preferably, the first angle of inclination α is between 0° and 75°, and even more preferably it is equal to 50°, while the second angle of inclination β preferably is between 0° and 75°, and even more preferably it is equal to 25°.

Moreover, the sum between the first angle of inclination α and the second angle of inclination β preferably is equal to the rotation angle γ, whereby the two angular switching positions P1, P2 are the end positions of the arc of rotation/oscillation of rod 2.

Moreover, the angular switching positions P1, P2 preferably are associated with respective inversion positions of the translation direction, preferably corresponding to mutually opposite ends of the translation stroke z.

In other words, the switching of the inclination of rod 2 preferably may be carried out at the same time as the inversion of the translation direction, in particular even more preferably, it may be carried out at the stroke end positions of rod 2.

According to a first embodiment of the rotation means shown in FIGS. 4A and 4B, the inclination switch 5a preferably comprises a flexible element 5b in the form of a chain, arranged parallel to the translation axis Z, and a coupling tooth 5c which is integral with rod 2 and configured to be reversibly coupled between the pins of chain 5b. When rod 2 translates along a first translation stroke z1, for example downwards, rod 2 remains inclined about the main axis X of the second angle of inclination β (that is, it is in the second angular position P2) since, by virtue of the elasticity/flexibility of chain 5, the coupling tooth 5c is shaped so as to pass in sequence between the pins of chain 5 without ever getting blocked. However, when the translation direction is inverted, that is rod 2 is translated along a second translation stroke z2 opposite to the first translation stroke z1, this time upwards, the coupling pin 5c remains coupled between two consecutive pins and induces the rotation of rod 2 until the inclination of rod 2 is switched from the first angular position P1 to the second angular switching position P2.

That is, rod 2 is rotated about the main axis X by a rotation angle equal to the sum of the first angle of inclination α and the second angle of inclination β.

In other words, the mechanical coupling described above determines, in the descending stroke, a negative angle of incidence which during the stroke inversion, is transformed into positive by virtue of the flexibility of the element.

The same effect may be obtained with the second embodiment shown in FIG. 5, in which the inclination switch 5a preferably comprises a fixed coupling notching 5d and a coupling pin 5e which is integral with rod 2, but oscillating, that is, provided with elasticity by means of springs (not shown). Indeed, the coupling pin 5e passes from one slot to another of notching 5d during the translation stroke z1, but when the direction of the translation stroke is inverted, the coupling pin 5e remains wedged inside a slot until the switching of the inclination of rod 2 occurs.

According to a third embodiment of the rotation means 5 shown in FIGS. 6, 6A and 6B, the rotation means 5 preferably comprise a linear actuator 5f, for example, a pneumatic cylinder, operable to move, along a sliding direction parallel to the translation axis Z:

- a pin 5g arranged parallel to the main axis X and inserted inside a coupling eyelet 5h which is integral with rod 2 (detail in FIG. 6A) to rotate rod 2 about the main axis X, or
- a pin 5g arranged parallel to the main axis X inside which there is inserted a radial tip 5i of rod 2 (detail in FIG. 6B) to rotate rod 2 about the main axis X.

Moreover, the linear actuator 5f preferably is mounted on a connection manifold 6 of the two rods 2, whereby it translates together with the two rods 2, but the actuation of the translation of the pins 5g inducing the rotation, preferably synchronous, of the two rods 2, remains independent.

According to a further aspect of the present invention, a washing machine 100 of objects 50 is provided, comprising:
- at least one washing device 1 according to the present invention,
- a sealed wash chamber 101 having at least one access door (not shown in the accompanying drawings for illustrative simplicity) and at least one washing wall 102 onto which at least one device 1 is installed, and
- at least one support device 110 configured to receive and support a plurality of objects 50 so as to arrange the respective surfaces 51 to be washed, during the use configuration, facing the operating plane XZ.

In particular, the sealed wash chamber 101 shown in FIGS. 1 and 2 has a substantially parallelepiped shape and has two vertical, parallel washing walls 102 facing and opposite to a front wall transversal to the two wash walls on which the access door is obtained, a rear wall opposite to the front wall, mutually parallel floor 103 and roof 104.

Preferably, the support device 110 is a movable trolley (it is provided with wheels in the illustrated example) adapted to be reversibly arranged inside the wash chamber 101 through the access door.

For illustrative simplicity, one upper row of objects 50 (in this case, they are bases of animal stalling cages) alone is arranged on trolley 110 illustrated in FIG. 1, while FIG. 2 illustrates an embodiment of trolley 110 in which there are arranged 7 vertically aligned horizontal rows of objects 50 (with the concavities 51 partially overlapping with respect to the horizontal) for each side of trolley 110.

Indeed, machine 100 preferably comprises at least two washing devices 1 defining two different, opposite and parallel operating planes XZ (defining the so-called opposite "benches" of machine 100) mounted on opposite washing walls 102 and between which said at least one support device 110 is interposed, or adapted to be interposed, in use. In particular, in the embodiment illustrated, each device 1 comprises two rods 2.

Moreover, machine 100 preferably comprises a plurality of sensors (not shown) configured to detect operating parameters of the plurality of objects 50, for example: number, type, shape, size, spatial arrangement with respect to the operating plane XZ, degree of surface dirt, and also type of load and/or trolley-support.

For example, machine 100 may detect the type of load and/or trolley-support by means of RFID, acquisition of bar code or other code.

Machine 100 further comprises a control and processing unit (not shown) configured to process the predetermined logic of device 1 as a function of the operating parameters detected and selectively control the actuation of the translation means 4 and the rotation means 5, and therefore, control the wash cycle.

In addition to allowing the complete coverage also in the case of row numbers greater than what is used in the prior art, machine 100 also allows dedicated and intelligent cycles to be carried out: with suitable programming of the control logic, partial washes by rows or by sectors may be obtained, or points of greater insistence of the wash jet towards the dirtiest areas and surfaces to be washed may be provided.

According to a further aspect of the present invention, a method for washing objects 50 is provided, comprising the steps of:
- providing at least one device 1 according to the present invention;
- providing a plurality of objects 50 on at least one support device 110 so that they are operatively facing the operating plane;
- selectively controlling the actuation of the translation and rotation of the at least one rod 2 according to a predetermined logic for moving the at least one rod 2 inside the operating plane XZ so that it faces the concavities 51 of the objects 50, and
- emitting a predetermined amount of jets of washing fluid from the plurality of nozzles 3 directly against the respective concavities 51 of the objects 50 in order to wash them thoroughly.

Figure 0A:
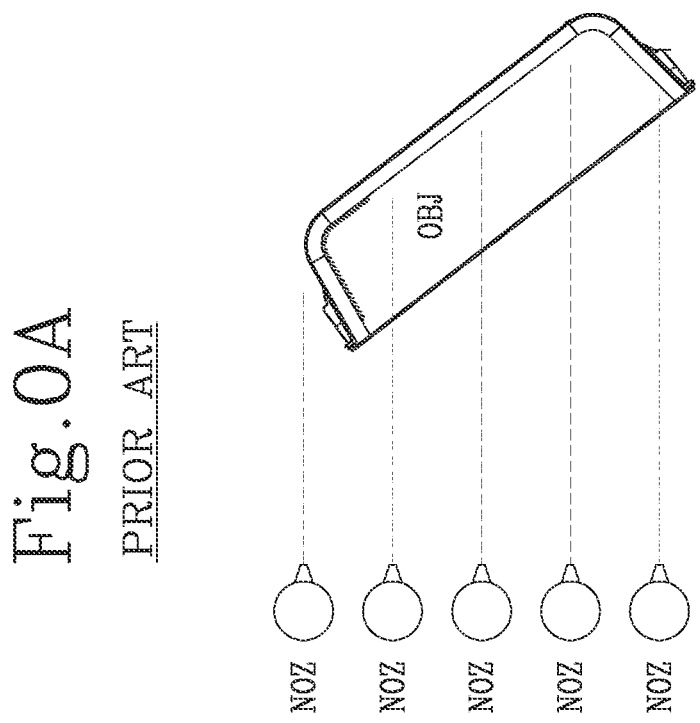
Figure 2B:
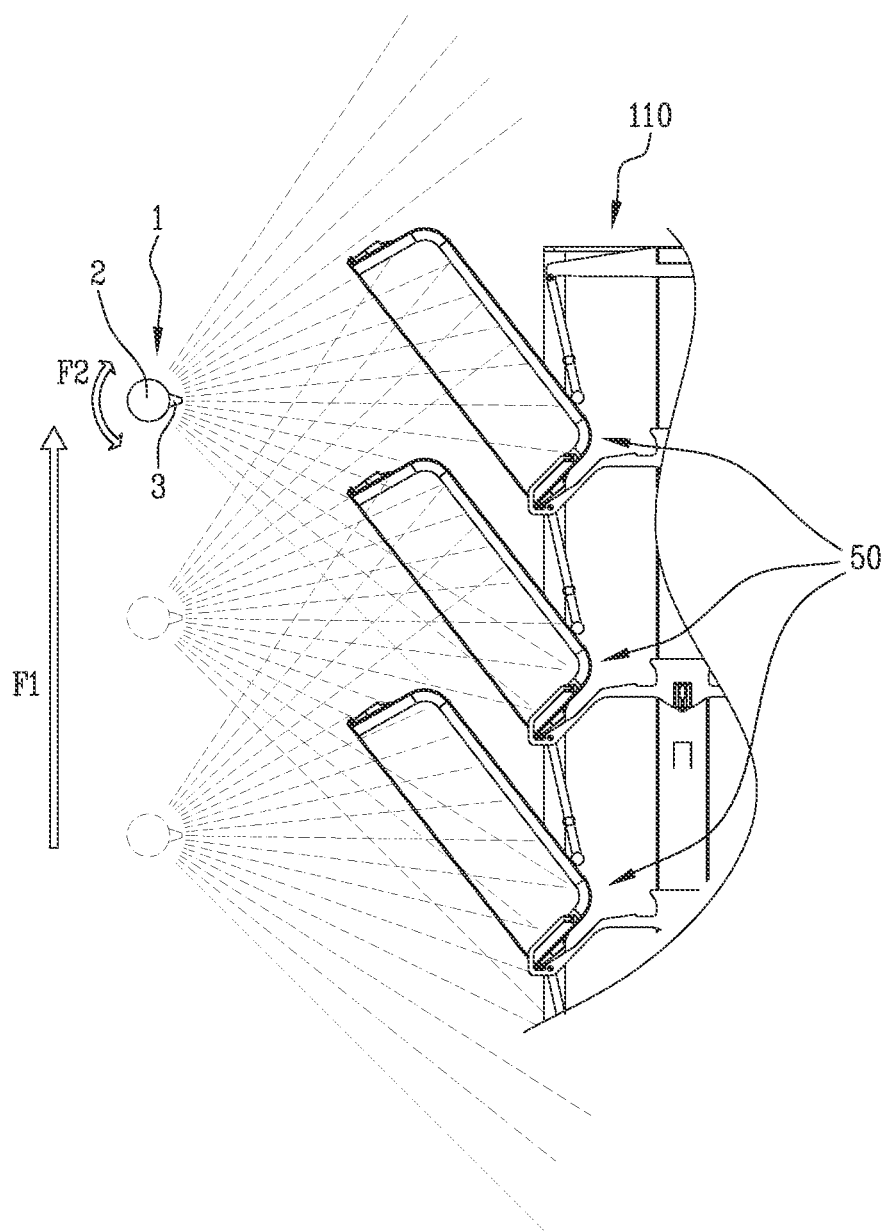
FIG. 2B is an operating diagram of the rod diagrammatically showing the possible directions of the jets of fluid.

Advantageously therefore, as shown in FIG. 2B, the nozzles 3 being able to translate along the translation stroke z2 (upwards in the example shown) and being able to rotate about the main axis X (as shown by arrow F2), they can strike any point of the concavities 51 which are arranged facing the operating plane XZ. For example, FIG. 2B shows a nozzle 3 moved along stroke z2 to be arranged aligned at three partially vertically overlapping objects 50: the directions of the jets of washing fluid clearly indicate how each surface portion of the concavities 51 is reached without leaving "dead areas", as in the solutions of the known art of FIGS. 0A, 0B. The translation and selective rotation of rod 2 allow the position of nozzle 3 to be adapted to be arranged in the optimal position to strike any point of the concavities 51.

Preferably, the control and emission steps of the fluid are carried out at the same time.

Preferably, the control step comprises a sub-step of switching the inclination of the at least one rod from the angular switching position P1 to the second angular switching position P2, and vice versa.

Preferably, the control step comprises a sub-step of translating the at least one rod 2 along the translation stroke z while inverting the translation direction at respective inversion positions of the translation direction, preferably corresponding to mutually opposite ends of the translation stroke.

Preferably, the switching of the inclination at the angular switching positions P1, P2 is obtained at the same time as the inversion of the translation at the respective inversion positions of the translation direction.

In other words, the control step may comprise for example:
- a first sub-step of translating the at least one rod 2 along a first translation stroke, preferably until reaching a first end of said translation stroke,
- a first sub-step of switching the at least one rod 2 between the first angular switching position P1 and the second angular switching position P2,
- a second sub-step of translating the at least one rod 2 along a second translation stroke in direction opposite to the first translation stroke, preferably until reaching a second end of the translation stroke, opposite to the first end, and
- a second sub-step of switching the at least one rod 2 between the second angular switching position P2 and the first angular switching position P1.

These washing modes advantageously allow a uniform wash cycle capable of also washing floor 103 and roof 104 to be carried out in order to avoid residuals of dirt or spatter from being accumulated over time.

Moreover, the inversion and switching points allow being effective in washing on the lower and upper rows also while limiting the translation stroke to what is needed.

In the event one rod 2 alone is employed, such a solution allows limiting the overall translation stroke z and, if several rods 2 are employed, operating them without overlapping, rather keeping a given dead area therebetween (which is useful for leaving part of the washing walls 102 of machine 100 free from the translation of the rods 2, which would preclude the mounting/passing of any other device on board the machine).

Preferably, the control step comprises a sub-step of oscillating the at least one rod 2 about the rotation axis R inside the rotation angle γ, in which the oscillation is preferably progressive until it reaches the first angle of inclination α of rod 2, and is preferably regressive until it reaches the second angle of inclination β of rod 2.

Preferably, the oscillation sub-step is obtained at the same time as at least one translation sub-step of the at least one rod 2 along the translation stroke z.

In other words, a possible operating mode is the one of roto-translating rod 2.

Preferably, the method may provide the simultaneous translation and/or the rotation of two rods 2 lying on the same operating plane XZ.

Moreover, as shown in the drawings, the respective concavities 51 of the objects 50 preferably are partially overlapping with respect to a neutral direction Y perpendicular to the operating plane XZ, and the concave objects are arranged along rows which are parallel to the operating plane XZ.

Indeed, by virtue of present invention, also increased load densities may be thoroughly washed, in which the objects 50 have partially overlapping arrangements (as shown in FIGS. 2 and 2B) to optimize the spaces on the support device 110. Similar load configurations cannot be employed with the known washing systems, but the present invention allows the correct management thereof by virtue of the versatility thereof.

As in the illustrated embodiments, the method preferably comprises a step of providing at least two washing devices 1 defining two different operating planes XZ, which are opposite and parallel to each other, between which a support device 110 is interposed, or adapted to be interposed, in use; said two washing devices 1 being preferably synchronously controllable.

Preferably, the method advantageously comprises a step of detecting operating parameters of the plurality of objects 50, for example, number, type, shape, size, spatial arrangement with respect to the operating plane XZ, degree of surface dirt, and a successive step of processing the predetermined logic as a function of the detected operating parameters for setting the control step. Thereby, the wash cycle may be completely customized according to the load needs and the detected degree of dirt. Thus, for example, the actuation alone of a given rod 2 may be controlled for a limited translation stroke z or the intensity of the jets may be increased or the wash cycle time may be decreased or the wash cycle and the rinse cycle may be modulated in a different manner.

By virtue of the present invention, it is apparent how by suitably selecting translation stroke z, distance between the rods 2, rotation angle γ and possible inversion/switching points, a complete coverage of the load may be obtained at the surfaces 51 to be washed, in particular, at the concavities, and at the same time the roof 104 and the bottom 103 of machine 100 itself may be struck, also in the presence of overlapping between the rows of objects 50.

It is also apparent from the diagrammatic example in FIG. 2A how such a result is possible by combining the two movements alone which allows coverage in otherwise unreachable areas (unless a remarkably high number of fixed jets is used, which would preclude the functionality and washing power of the system).

Moreover, by suitably configuring support 110, the drinking bottles, which usually are directed by employing dedicated baskets which retain them and present them for washing so as to make them draining, may also be conveniently washed and/or rinsed. Therefore, it is easy to effectively wash, and especially rinse, also the bottles by directly using the system described.

The washing and/or rinsing which may be obtained with the present invention is completely adaptable to the type of load by virtue of the versatility of device 1 and machine 100: for example, in the case of non-uniform loads or loads with different areas of dirt, a more accurate and dedicated wash may be programmed by persisting more with the jets in certain areas of the objects 50. Moreover, half load cycles may be carried out (for example, loading only the upper or lower rows of machine 100), therefore creating targeted cycles which allow saving time and energy, as well as allowing increased flexibility in managing the load to be washed and/or rinsed.

The present invention reaches the proposed objects while overcoming the drawbacks of the known art and providing the user with a device 1, a machine 100 and a method for washing and/or rinsing which are highly versatile and efficient, capable of optimizing the washing process and making the production process more affordable in terms of energy consumption, detergents used, sizes and investments.

A single machine 100 having compact sizes allows to effectively process a large number of objects 50 provided with surfaces to be washed of any shape, in particular surfaces that can be defined with the term "sculptured", and in particular concavities 51, and of different types, by means of at least one device 1, which is structurally simple.

The invention claimed is:

1. A method of washing objects for stalling laboratory animals, including parts and/or accessories of stalling cages, comprising the steps of:
   providing at least one washing device comprising
      at least one rod extending along a main axis thereof and connectable to a source of pressurized washing fluid,
      a fluid conveying system comprising a conduit connected to the source of pressurized washing fluid and operatively connected with the at least one rod,
      a plurality of nozzles adapted to emit respective jets of said washing fluid, said plurality of nozzles being connected to said fluid conveying system and supported by said at least one rod;
      a translation mechanism for said at least one rod configured to translate said at least one rod along a translation stroke extending a translation distance along a translation axis, which translation axis is transverse to the main axis, and
      a rotation mechanism for said at least one rod configured to alternately rotate said at least one rod about a rotation axis parallel to the main axis within an angular range of rotation;
   providing a plurality of objects on at least one support device so that the plurality of objects are operatively facing an operating plane defined by said main axis and said translation axis;
   selectively controlling actuation of a translation and a rotation of said at least one rod according to a predetermined logic for moving said at least one rod inside the operating plane to face respective surfaces to be washed of said plurality of objects, and
   emitting a predetermined amount of jets of the washing fluid from said plurality of nozzles directly against the respective surfaces to be washed of the plurality of objects in order to wash the plurality of objects thoroughly.

2. The method according to claim 1, wherein said controlling step comprises switching an inclination of the at least one rod, from a first angular switching position corresponding to a first angle of inclination of the at least one rod with respect to a neutral plane perpendicular to the operating plane, to a second angular switching position corresponding to a second angle of inclination of the at least one rod with respect to the neutral plane, and vice versa; said first and second angular switching positions respectively being opposite to said neutral plane.

3. The method according to claim 1, wherein said controlling step comprises oscillating said at least one rod about the rotation axis inside said angular range of rotation, wherein said oscillation is progressive until reaching a first angle of inclination of the at least one rod with respect to a neutral plane, perpendicular to the operating plane, and is regressive until reaching a second angle of inclination of the at least one rod with respect to the neutral plane.

4. The method according to claim 1, wherein said at least one rod comprises two parallel rods lying inside a same operating plane and mutually constrained in translating along the translation stroke, the rods being independently translatable and/or rotatable at the same time.

5. The method according to claim 1, wherein said operating plane is vertical, said translation stroke is vertical and said main axis is horizontal, so that translating is obtained from a bottom of the least one washing device upwards and vice versa.

6. The method according to claim 1, wherein the respective surfaces to be washed of the plurality of objects are partially overlapping with respect to a direction perpendicular to the operating plane, said plurality of objects being arranged along rows which are parallel to the operating plane.

7. The method according to claim 1, wherein said at least one washing device includes at least two washing devices defining two different operating planes, which are opposite and parallel to each other, between which said at least one support device is interposed, or adapted to be interposed, in use; said at least two washing devices being controllable synchronously.

8. The method according to claim 1, comprising a step of detecting operating parameters of the plurality of objects, including number, type, size, shape, and spatial arrangement with respect to the operating plane the plurality of objects; degree of surface dirt, and a successive step of processing said predetermined logic as a function of the operating parameters detected for setting said controlling step.

9. The method according to claim 2, wherein said controlling step comprises translating said at least one rod along said translation stroke and inverting a direction of translating at respective inversion positions of the translating corresponding to opposite ends of said translation stroke.

10. The method according to claim 3, wherein said oscillating is performed at a same time as the translating of the at least one rod along the translation stroke.

11. The method according to claim 9, wherein the switching the inclination of the at least one rod is obtained at a same time as the inverting the direction of translating at the respective inversion positions of the translating.

\* \* \* \* \*